(12) United States Patent
Faris

(10) Patent No.: US 6,563,553 B1
(45) Date of Patent: May 13, 2003

(54) FLAT PANEL DISPLAY AND METHOD OF MANUFACTURE

(75) Inventor: Sadeg M. Faris, Pleasantville, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/228,216

(22) Filed: Jan. 11, 1999

Related U.S. Application Data (63) Continuation-in-part of application No. 08/784,440, filed on Jan. 16, 1997.

(51) Int. Cl.[7] ................ G02F 1/133; G02F 1/1347
(52) U.S. Cl. .................. 349/5; 349/61; 349/115; 349/176; 349/196
(58) Field of Search ................ 345/87, 50, 51, 345/90, 92, 98, 204, 205, 206, 211, 214; 349/1, 23, 115, 176, 196, 197, 202, 117, 5, 71, 57, 61; 257/72

(56) References Cited

U.S. PATENT DOCUMENTS

| | | | | |
|---|---|---|---|---|
| 4,818,049 A | * | 4/1989 | Assenheim et al. | 362/32 |
| 5,082,354 A | * | 1/1992 | Kalmanash | 349/115 |
| 5,221,982 A | * | 6/1993 | Faris | 353/31 |
| 5,459,591 A | * | 10/1995 | Faris | 349/115 |

* cited by examiner

Primary Examiner—Robert H. Kim
Assistant Examiner—Tai Duong
(74) Attorney, Agent, or Firm—Thomas J. Perkowski Esq., P.C.; Ralph J. Crispino (57) ABSTRACT

Disclosed are improved beam steering and scanning devices which utilize cholesteric liquid crystal (CLC) elements arranged in branches to form a logic tree structure. Each branch thereof comprises an active and passive CLC element; the former further comprising a half-wave retarder and an electrode and the latter only the CLC element. Each succeeding branch contains twice as many branches as a preceding branch and, by activating active CLC element electrodes under control of a programmable pulsed source, inputs applied to the first stage of a logic tree are delivered as a scanned line of electromagnetic energy or light to the imaging cells of the last stage of the logic tree. By stacking identical logic tree structures with a laser source for each tree, a flat panel imaging array or display panel is formed in which the transmission intensity losses are minimized. The resulting system can be used to produce 2-D and 3-D images by applying a modulation to the laser sources from standard television cameras, and cameras designed to capture stereo-displaced images, respectively.

11 Claims, 8 Drawing Sheets

FLAT PANEL DISPLAY AND METHOD OF MANUFACTURE

This Application is a Continuation-in-part of application Ser. No. 08/7840,440 filed Jan. 16, 1997.

BACKGROUND OF THE INVENTION

1. Technical Field

The present invention relates generally to an improved image display system in which electromagnetic energy beams (e.g. collimated laser beams) are steered reflected within a or substantially planar structure in such a way which minimizes transmission intensity losses and the required number of energizing (e.g. laser beam) sources therewith. Also, the present invention relates to a novel method of fabricating such improved image display systems and devices in an inexpensive and mass-production manner.

2. Brief Description of the Prior Art

The need to produce images for visual display is widespread in our society. For decades, cathode ray tubes (CRT) have been used to scan electron (i.e. cathode ray) beams across phosphor display screens in order to form images in accordance with video signals. By virtue of physical necessity, such electron beams have been deflected within CRTs using magnetic and/or electric force fields which vary over time in accordance with video signals representative of images being sequentially displayed.

As an alternative to CRT display devices, it is possible to form images on a display surface by scanning a laser beam, rather than an electron beam, through a volume of space across a display surface. This approach is similar to that employed during conventional laser light shows, except that during a laser light show the display surface is typically a ceiling surface or atmospheric vapor. Scanning a laser beam across such a display surface may be accomplished using a variety of electro mechanical or electro-acoustic scanning technologies, numerous examples of which are described in great detail in "Laser Scanning Notebook" by Leo Beiser, published November 1992 by SPIE Optical Engineering Press, Bellingham, Washington, USA. However, like CRT display systems, conventional laser scanning display systems cannot be made physically compact nor can they avoid the use of galvanometric and electro-acoustic scanning apparatus. Such image display techniques suffer from a number of shortcomings and drawbacks. In particular, display structures embodying these techniques require a large volume of space due to the small angle through which the light beam can be deflected. Thus, if it is desired to scan a length B, the deflection arrangement must be positioned at a distance, A, providing an A/B ratio larger than 1, and therefore making it difficult, if not impossible to construct a flat-type display panel structure for color image display.

During the past few decades, a need has arisen for image display devices having both flat panel surface characteristics and thin depth dimensions. Numerous image display systems having such characteristics have been developed. In general, such systems have pixelated display surfaces which produce images composed of light rays emanating from discrete pixel elements activated in accordance with video signals. An electrical voltage is derived from the video signal for each pixel along the display surface, and the derived voltage is used to change either the optical or electrical properties of the associated pixel. In the case of LCD panels, such changes in optical properties of the pixels permit selective passage of light produced from behind the display surface. In the case of plasma display panels, changes in the electrical properties of encased plasma gases result in emission of light from activated pixels.

While these prior art display technologies have made it possible to make flat display devices with very thin depth dimensions and thus overcome the principal drawbacks associated with CRT display devices, prior art flat panel device technology has nevertheless suffered from some very significant shortcomings and drawbacks. In particular, it is presently impossible to make large-area flat panel display panels using current LCD technology. In addition, conventional flat panel display panels are very inefficient in terms of energy usage. Consequently, the uses to which conventional flat panel display technologies can be put have been necessarily limited.

In International PCT Publication Number WO 95/24671, based on the teachings of U.S. Pat. No. 5,459,591 to S. M. Faris, which is incorporated herein by reference in its entirety, Applicants addressed the above-described problems associated with prior art flat-panel display technology. This was done by teaching how to make large planar display structures comprising a plurality of imaging cells arranged in the form of an array, wherein each imaging cell incorporates a solid-state cholesteric liquid crystal (CLC) element, an electronically controlled, variable half-wave retarder and a source of circularly polarized light. The CLC element is disposed to an angle (45°) relative to the path along which light from the source is projected and is designed to reflect, at a given wavelength, one circular polarization of light and transmit the other. Using this characteristic, light of one polarization state or the other is presented to the variable retarder and depending on whether or not it is actuated, light is either diverted into another orthogonal path or remains in the original path. When another similar imaging cell is disposed in the orthogonal path, fight incident on that cell can also be diverted into yet another path or transmitted along the orthogonal path under control of a half-wave retarders associated with said another imaging cells. By selectively activating half-wave retarders associated with each of the cells, monochromatic or polychromatic light from a single source or multiple sources may be steered to a selected cell and reflected from its associated CLC element or elements. Utilizing successive cells in the array, and causing reflection of a modulated beam or beams, produces an image display frame akin to that produced by conventional television sets and viewable as an integrated picture. When successive image display frames are produced, moving images are displayed from the planar display structure.

While Applicants' prior art image display system addresses many of the problems associated with prior art flat-panel display technologies, it nevertheless suffers from several shortcomings and drawbacks which have made widespread commercial applications thereof hitherto impractical.

In particular, within Applicants' prior art flat panel display system design, the laser light beams sustain very high intensity losses during beam steering and transmission operations, making it very difficult to produce bright images without using high power laser light sources. In addition, within Applicants' prior art flat panel display system design, numerous laser light sources are required, rendering the cost of manufacture prohibitive.

Thus, there is a great need in the art for an improved method and apparatus for steering electromagnetic beams within substantially planar display structures in order to produce color images therefrom, while avoiding the shortcomings and drawbacks of prior art apparatus and methodologies.

DISCLOSURE OF THE PRESENT INVENTION

Accordingly, it is a primary object of the present invention to provide an improved flat panel display structure which overcomes the shortcomings and drawbacks of prior art systems and methodologies.

A further object of the present invention is to provide such a flat panel display structure, wherein a novel imaging array is employed that substantially reduces the transmission losses therewithin and the required number of energizing sources.

Another object of the present invention is to provide an imaging array which reduces transmission losses while simultaneously reducing the electromagnetic energy source requirement to one source.

Another object of the present invention is to provide an improved flat panel display structure which is capable of producing both 2-D and 3-D images in either the direct or projection viewing mode of operation.

Another object is to provide a novel method of fabricating a flat panel display structure in inexpensive and mass-production manner.

Another object of the present invention is to provide a novel and inexpensive method of manufacturing a flat panel display structure in a way which requires neither a vacuum envelope nor unacceptable high voltages.

Another object of the present invention is to provide such a flat panel display, wherein an array of CLC elements and controllable retarders are configured to scan a circularly polarized input bearm from point to point in a panel-like display, or to steer a circularly polarized input beam so that it can emanate from any location on an array of imaging.

Another object of the present invention is tot provide a flat-panel display structure having an A/B ratios which is very mush less than 1.

Another object of the present invention is to provide a flat-panel type scanning arrangement that enables scanning speeds in the microsecond range.

Another object of the present invention to provide a laser beam scanning array capable of scanning or steering an electromagnetic beam along a plurality of paths, without the use of electromechanical or electro-acoustic elements.

A further object of the present invention is to provide a one-dimensional (i.e. linear) laser beam scanning array, in which a collimated laser beam emanating from a single point source can be selectively steered along an one of a plurality of propagation paths in space so as to produce color images over large display surface areas.

A further object of the present invention is to provide such a laser beam scanning array wherein electronically controllable retarders, are used to change the paths of the collimated laser beam, instant-to-instant, while taking advantage of both the transmissive and reflective capabilities of CLC elements.

A further object of the present invention is to provide an electro-optical image display system having a substantially planar display panel with thin depth dimensions, and employing the novel laser beam steering array of the present invention.

A further object of the present invention is to provide such an electro-optical image display system for use in displaying images in either direct or projection viewing applications.

A further object of the present invention is to provide such an electro-optical image display system in which the need for vacuum envelopes, electron beam scanning, and back-lighting type structures are altogether eliminated.

Another object of the present invention is to provide such an electro-optical display system, in which a laser beam having different spectral components in the visible band is steered within the image display device using an array of beam steering cells having the reflection-transmission characteristics of cholesteric liquid crystal (CLC) film material.

Another object of the present invention is to provide such an electro-optical image display system in which electronically controllable retarders and associated polarizing reflective elements are used to steer the laser beam, from point to point, within the flat panel image display device, on i a real-time basis, for video image display capabilities.

Another object of the present invention is to provide such an electro-optical image display system, in which the cross-sectional dimensions of the laser beam can be made sufficiently small so that the spatial period of the beam steering cells can also be made sufficiently small for high-resolution display surface applications, such as laptop computer systems and the like.

Another object of the present invention is to provide such an l electro-optical image display system, in which the laser beam is produced and intensity modulated external to the image display device and coupled thereto by way of a flexible fiber optical cable or like device.

Another object of the present invention to is provide such an electro-optical image display system, in which the display surface includes a pixelated panel of light dispersive pixels, each comprised of randomly dispersed microprisms or like elements, for dispersing the spectral components of the modulated laser beam as it emerges from the display surface in the direction of the viewer, thereby permitting full angular viewing of the displayed imagery.

Another object of the present invention is to, provide such an electro-optical image display system, in which the laser beam is shifted in wavelength as it emerges from the display surface of the system.

A further object of the present invention is to provide such an electro-optical image display system, in which the physical dimensions of the display surface can be made sufficiently large so as to permit direct public viewing of displayed imagery, as experienced in stadiums, theme parks, and other signage applications.

A further object of the present invention is to provide such an electro-optical image display system which can be readily adapted for viewing of stereoscopic images using either time-multiplexing, spatial-multiplexing, or spectral-multiplexing techniques well known in the art.

A further object of the present invention is to provide a novel method of steering collimated laser beams within an essentially flat panel structure, for laser beam scanning applications and image display applications alike.

Another object of the present invention is to provide an improved beam steering mechanism which can be used to construct various types of electro-optical systems and devices, including flat panel image display structures. The beam steering mechanism utilizes active and passive CLC elements arranged in branches to form a tree-like structure which shall be referred to hereinafter as "a logic tree structure". Each branch of the logic tree structure comprises an active and passive CLC element. The active CLC element comprises a half-wave retarder and an electrode. Each succeeding branch of the logic tree structure contains twice as many branches as a preceding branch and, by activating the CLC element electrodes under control of a programmable pulsed source, inputs applied to the first stage of the logic tree structure are delivered as a scanned line of electromagnetic energy or light to the imaging cells of the last stage of the logic tree structure. By stacking identical logic tree structures with a laser source for each tree structure, a flat panel imaging array or display device can be formed in which the beam intensity losses are minimized during transmission therethrough.

Using a similar imaging array, transmission losses may be further reduced by using a logic tree structure having outputs which act as inputs to the imaging array, where formerly a plurality of lasers were required. By positioning an input logic tree structure perpendicularly to similar logic tree structures comprising the imaging array, a single source of energy (e.g. laser beam) provides an output at each of its imaging cells which acts as an input to an associated logic tree structure of the imaging array.

In this way, a scanned line is delivered from each imaging cell of the input logic tree structure to the first active element of an associated logic tree structure array. From there, under control of a programmable pulsed generator, portions of the scanned line are directed to the output imaging cells of each of the logic tree structure arrays. Two-dimensional images are built up in this way by activating the imaging cells of each logic tree structure array in succession.

Three dimensional images may be obtained using an approach similar to that just described by interleaving stereo displaced images from a 3-D camera at the output imaging cells of an imaging array by activating the first and every other logic tree structure of an array with one image and the second and every other logic tree structure with a stereo displaced image. Viewing glasses which respond to a different polarization for each eye are required to produce the 3-D effect. 2-D and 3-D images are provided by applying modulation to a laser from standard television cameras, as well as cameras designed to provide stereo-displaced images, respectively.

In the array which provides 3-D images, an image and a stereo displaced image are interleaved to provide the desired images each of which has a different circular polarization state.

The present invention also relates to a method of fabricating structures which provide the above described features. Since all the stages of a logic tree structure differ only in the number of branches they contain, the light beams, for example, applied from a laser beam could pass through a number of stages with minimum dispersion and maintain its original position even though relatively large structures are used to control its position. This permits the use of CLC elements, electrodes and half-wave retarder material which need not be divided into discrete elements in each logic tree structure. Thus, each CLC element, each electrode and each retarder material may extend from top-to-bottom or from side-to-side in each stage of an imaging array.

Stages of each logic tree structure can be fabricated by slicing layers of insulating material and CLC material at an angle of 45°. The thickness of the insulating material controls the spacing between the resulting CLC elements. Transparent layers, such as indium tin oxide are formed on both sides of the layer or layers containing spaced CLC elements. Using photolithographic techniques, one side in masked and etched to form an electrode over every other CLC element. A spacer element fixed to the periphery of each layer where the electrodes have been etched forms a volume into which half-wave retarder material is introduced in liquid form. The resulting stages are then stacked using as many as required to form an imaging array with a desired number of imaging cells. Stacking the stages, which are slices containing differently spaced CLC elements, automatically provides the logic tree structures which deliver scanned line to the output imaging cells. The method uses mass-production techniques and results in an inexpensive flat-panel display. In this way, stages containing two, four, eight, sixteen, CLC elements and so on have been mass produced. The stages are then stacked so that each stage contains twice as many CLC elements as a preceding stage, forming logic tree structures comprising the imaging cells which form an array.

These and other objects of the present invention will become apparent hereinafter and in the Claims to Invention.

BRIEF DESCRIPTION OF THE DRAWINGS

The foregoing objects and features of the present invention will become apparent from the following more detailed description of Best Modes Of Carrying Out The Present Invention which is to be read in conjunction with the accompanying Drawings, wherein.

BEST MODES FOR CARRYING OUT THE INVENTION

Referring to the Figures of the accompanying Drawings, the Best Modes For Carrying Out The Present Invention will now be described in detail below, wherein like structures and elements shall be indicated with like reference numerals throughout the Figure drawings.

Figure 1:
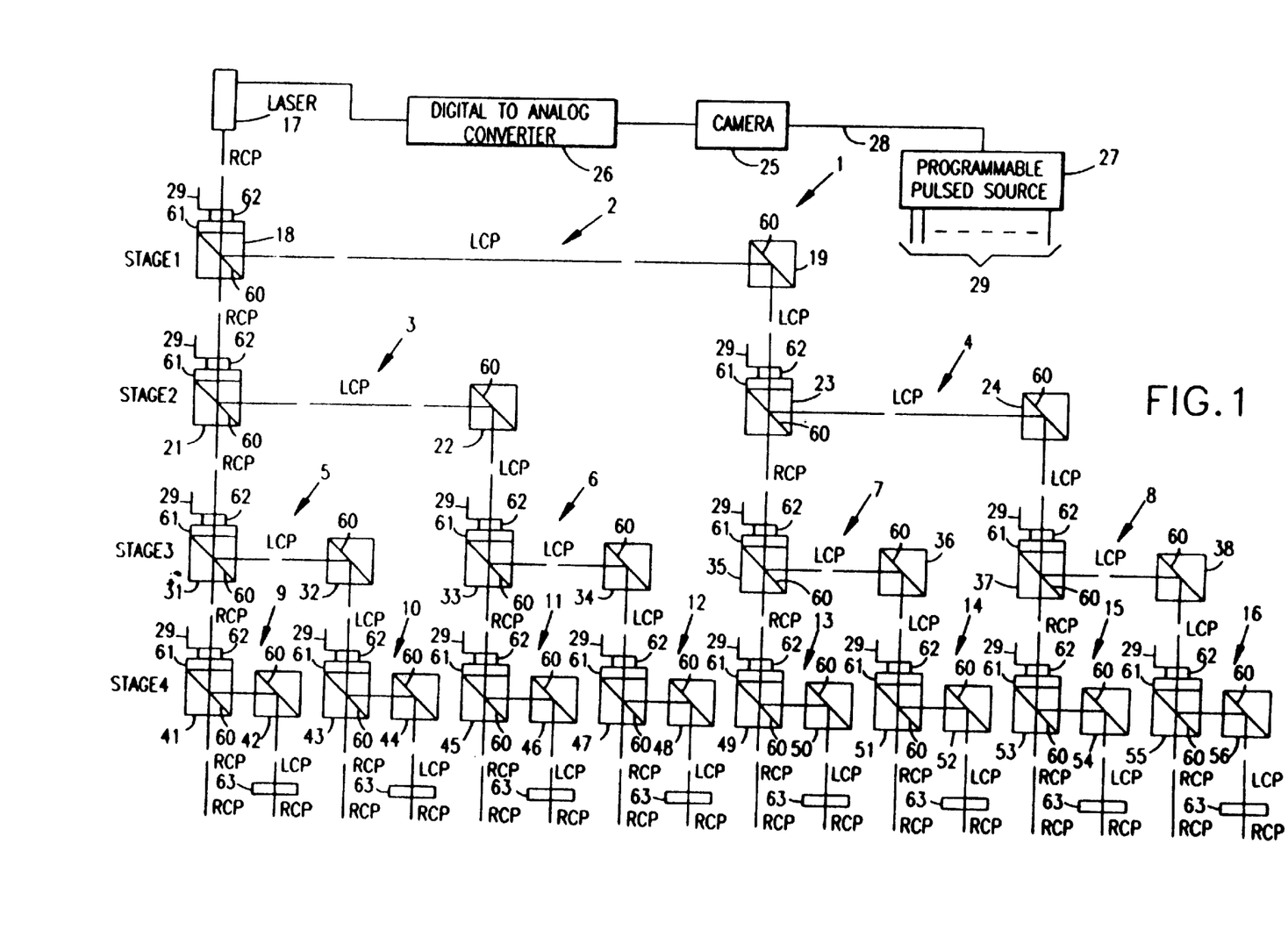
FIG. 1 is a schematic drawing of a logic tree structure of active and passive Cholesteric Liquid Crystal (CLC) elements sol arranged that a single input to a first stage of the logic tree structure may be delivered to any one of the outputs of the last stage of the logic tree structure.

Referring now to FIG. 1, there is shown a schematic drawing of a logic tree structure in accordance with the present invention which can be used to construct various types of electro-optical systems and devices, including large-scale flat panel image display structures. As shown, the logic tree structure comprises both active and passive Cholesteric Liquid Crystal (CLC) elements which are so arranged and controlled that a single input to a first stage of the logic tree structure may be delivered to any one of the outputs of the last stage of the logic tree structure by appropriately switching electronically controlled half-wave retarders associated with the active CLC elements of the logic tree structure. By programming the switching of the half-wave retarders of each stage of the logic tree structure, a laser input to the first stage of the logic tree structure may, for example, provide a scanned version of the input at the outputs of the last stage of the logic tree structure. The application of the logic tree structure as a scanner will be described in detail in what follows. It will also become clear that the same embodiment has other applications.

Considering FIG. 1 in more detail, logic tree structure 1 is shown consisting of a plurality of stages labeled STAGE 1–STAGE 4 wherein each stage includes one or more branches each of which consists of an active and passive CLC element. Thus, STAGE 1 consists of a branch 2, which, in turn, includes active CLC element 18 and passive ELE element 19. STAGE 2 consists of branches 3, 4; the former including active CLC element 21 and passive CLC element 22 while the latter includes active CLC element 23 and passive CLC element 24. STAGE 3 consists of four branches 5–8 each of the branches consisting of active and passive CLC elements 31, 33, 35, 37 and 32, 34, 36, 38, respectively. Similarly, STAGE 4 consists of eight branches 9–16 each of these branches including active and passive CLC elements 41, 43, 45, 47, 49, 51, 53, 55 and 42, 44, 46, 48, 50, 52, 54, and 56, respectively, just like the previously mentioned branches. At this point, it should be appreciated that many more stages may be added to tree 1 with each succeeding stage having twice as many branches as the preceding stage. Using this approach, STAGE 4 in FIG. 1 has 2n–1 branches wherein n is the stage number. Thus, STAGE 4 has 24–1 or eight branches. Since each branch has two CLC elements, each stage has 2n elements and, for STAGE 4, sixteen elements. Thus, STAGE 10, for example, would have 210 or 1024 CLC elements providing one light output per element or 1024 outputs.

Since FIG. 1 is representative of the way logic tree structure 1 operates regardless of the number of stages, only four stages have been incorporated to clearly demonstrate how such a logic tree structure may be used to provide a scanned light output from a plurality of elements which are activated by an input from a single source of electromagnetic energy.

Before describing the operation of FIG. 1, it should be understood that the active CLC elements of each branch in FIG. 1 do not depart from similar active elements shown in FIG. 1 of U.S. Pat. No. 5,459,591 entitled "Electromagnetic Energy Beam Steering Devices" in the name of S. M. Faris, which is hereby incorporated herein by reference in its entirety. The passive CLC elements of the present invention differ from the active CLC elements in that the passive CLC elements do not incorporate an electronically controlled, variable half-wave retarder or π-cell. Thus, each branch of logic tree structure 1 as represented by branch 2 of FIG. 1 includes an active CLC element 18 and a passive CLC element 19. The former, includes a cholesteric liquid crystal member 60, a transparent electrode 62, a ground plane (not shown), and a controllable half-wave retarder 61, while the latter includes a cholesteric liquid crystal member which is identical to member 60. Since each of the branches 3, 4, 5–8 and 9–16 is identical with branch 2 of FIG. 1, each cholesteric liquid crystal element and each half-wave retarder of each branch is identified with the same reference numbers 60, 61 respectively.

In FIG. 1, active CLC element 18 and passive CLC element 19 of branch 2 both include cholesteric liquid crystal members 60 which are disposed at an angle, preferably 45°, within each of the elements 18 and 19. Members 60 are made from a nematic liquid crystal material with chiral additives or polysiloxane side-chain polymers which cause the cigar-shaped molecules to be spontaneously aligned in an optically active structure of either a left-handed or right-handed helix with a helical pitch, P. The twisting direction and the pitch, P, of the helical are determined by the nature and concentration of the additives. A CLC member, like member 60, has all its helical aligned in one direction and is capable of reflecting light, for example, having one circular polarization having a characteristic wavelength or band of wavelengths. Cholesteric Liquid Crystal (CLC) members 60 which are used in the practice of the present invention and their method of fabrication are shown in U.S. Pat. No. 15,221,982, filed Jul. 5, 1991 and issued on Jun. 22, 1993 in the Faris. This patent is herein incorporated by reference in its entirety. While CLC members 60 are shown in FIG. 1 as being single elements, it should be understood that a plurality of CLC members 60 may be substituted for each of the members 60 to provide for the reflection and transmission of circularly polarized radiation having a plurality of wavelengths or band of wavelengths which are provided by a plurality of sources of electromagnetic radiation. It should be appreciated that, in the practice of the present invention, members 60 may be made of any material which can be switched to reflect and/or transmit electromagnetic energy by the application of electric or magnetic fields to that material.

Half-wave retarders or π-cells 61 shown schematically in FIG. 1 are of the type shown and described in U.S. Pat. No. 4,670,744, filed Mar. 14, 1985 and issued on Jun. 2, 1987 in the name of T. S. Buzak and may be utilized in the practice of the present invention. The Buzak patent is incorporated herein by reference in its entirety. Alternatively, instead of CLC films, polarizing reflectors, polarizing prisms or McNeill prisms may be utilized in the practice of the present invention and are commercially available. When more than a single wavelength of electromagnetic radiation is used in the arrangement of FIG. 1, a broad band π-cell may be utilized to provide half-wave retardation of each wavelength to maintain the same intensity level for each wavelength.

Logic tree structure 1 of FIG. 1 is activated from a source 17 of electromagnetic radiation which may be a laser or any other source of radiation the output of which may be converted from a linearly polarized orientation to a circularly polarized orientation by means of a quarter-wave plate (not shown) in a manner well known to those skilled in the optical arts. If the resulting output is not appropriately polarized, a half-wave retarder may be utilized to provide the conversion from one circular polarization to the other polarization.

For purposes of the present application, radiation emanating from source 17 is circularly polarized in either a clockwise or counter-clockwise direction. Lasers which are commercially available may be utilized to provide outputs which fall within the visible, infrared or ultraviolet spectra. While source 17 is shown as a single source in FIG. 1, it should be appreciated that it also represents a plurality of sources each having a different wavelength. Thus, source 17 may include lasers which emit at the red, green and blue wavelengths of the visible spectrum so that the projected beam of radiation is a beam of light having a single color or combinations of these wavelengths.

It should also be appreciated that source 17 may comprise lasers or other sources of electromagnetic radiation which are capable of being intensity modulated. In this way, the source output may be varied in intensity from zero to a maximum intensity including all gradations in between.

In FIG. 1, source of electromagnetic radiation 17 is shown directly irradiating a member 60 of active element 18 of branch 2 from which it is either transmitted or reflected depending on the polarization of the emitted radiation. The emitted radiation from source 17 may have a single intensity or it may be an intensity modulated signal provided by a television camera 25 or the like. By appropriately programming π-cells or half-wave retarders 61, an unmodulated or intensity modulated signal is delivered in a scanned manner to the active and passive CLC elements 41–56 of branches 9–16 of STAGE 4. In this way, an unmodulated or intensity modulated beam of radiation is way to a single scan line of a conventional television set.

If an input is provided in digital form, a digital-to-analog converter 26 may be interposed between camera 25 and source 17 in a well-known manner.

In FIG. 1, variable half-wave retarders 61 are activated by a programmable pulsed source 27 which gets timing information from camera 25 via interconnection 28. A plurality of driver interconnections 29 extend from pulsed source 27 and each interconnection 29 is connected to a separate electrode 62 which applies an electric field to an associated half-wave retarder 61 when activated by pulsed source 27. In FIG. 1, fifteen driver interconnections 29 would be utilized each one of which, when pulsed, activates a separate variable half-wave retarder 61.

In operation, logic tree structure 1 is activated when source 17 is activated. The object is to provide a scanned output from a single input to a plurality of outputs in STAGE 4 of logic tree structure 1. It is, therefore, required that the outputs of active and passive elements 41, 43, 45, 47, 49, 51, 53, 55 and 42, 44, 46, 48, 50, 52, 54 and 56, respectively, be activated so that outputs are obtained from these elements in the order shown in FIG. 1. Since element 41 is to provide the first output, if the input signal is right-hand circularly polarized (RCP) radiation and all members 60 are designed to be reflective of left-hand circularly polarized (LCP) radiation, the RCP light passes through active elements 18, 21, 31 and 41 unhindered since these elements reflect LCP radiation and transmit RCP radiation. A RCP radiation output, therefore, appears at the output port of element 41.

In the next time period, half-wave retarder 61 of element 41 is activated by a pulse from pulsed source 27 via an interconnection 29 to electrode 62 causing retarder 61 to introduce a half-wave delay into the input RCP radiation which has passed through active elements 18, 21 and 31 causing the RCP radiation to be converted to LCP radiation. The LCP radiation then reflects from member 60 of element 41 which is reflective of LCP radiation toward member 60 of element 42 which is also reflective of LCP radiation. The impinging LCP radiation is then reflected to the output port of element 42.

In the next time period, an output is desired from the output port of active element 43. To accomplish this, retarders 61, at the inputs of active elements 31 of STAGE 3 and active elements 43 of STAGE 4 are activated by applying pulses to their associated transparent electrodes 62.

Once this is done, the RCP radiation at the input of active element 31 is converted to LCP radiation and reflects from LCP reflective member 60 to LCP reflective member 60 of passive element 32 where it is reflected toward active element 43. The LCP input at active element 43 encounters a half-wave retarder 61 and is converted to RCP radiation. The latter then passes unaffected to the output port of active element 43 because its CLC member 60 reflects only LCP radiation.

In the next interval, pulsed source 27 deactivates half-wave retarder 61 associated with active element 43 and continues activation of the half-wave retarder 61 associated with active element 31. In this way, the LCP radiation impinging on element 43 encounters no delay and remains as LCP radiation which is then reflected from LCP reflective member 60 of element 43 toward passive element 44. The thus reflected LCP radiation is reflected from LCP reflective member 60 of element 44 to its output port.

Rather than tediously describe every passage through every element, the order of the activation of half-wave retarders 61 will be described since every path from input to output port can be gleaned from the previous description and drawing shown in FIG. 1. To obtain an output at active element 45, only the variable half-wave retarders 61 associated with active elements 21 and 33 must be activated. To obtain an output at active element 46, variable half-wave retarders 61 associated with active elements 21, 33 and 45 must be activated. To obtain an output at active element 47, the variable half-wave retarders associated with active elements 21 and 47 must be activated. To obtain an output at passive element 48, only the variable half-wave retarder associated with active element 21 need be activated. An output at active element 49 may be obtained by activating the half-wave retarders associated with active elements 18 and 23. An output at passive element 50 may be obtained by activating the half-wave retarders associated with active elements 18, 23 and 49. To obtain an output at active element 51, the half-wave retarders associated with active elements 18, 35 and 51 must be activated. An output may be obtained from passive element 52 by activating half-wave retarders 61 associated with active elements 18, 23 and 35. To obtain an output at active element 53, half-wave retarders 61 associated with active elements 18 and 37 must be activated. An output at passive element 54 may be obtained by activating half-wave retarders 61 associated with active elements 18, 37 and 53. To obtain an output at active element 55, half-wave retarders 61 associated with active elements 18 and 55 are activated. Finally, active element 56 is activated by activating half-wave retarder 61 associated with active element 18.

Once half-wave retarders 61 are activated by applying pulses to transparent electrodes 62 from programmable pulsed source 27 as described hereinabove, a scanned output varying in intensity at each of the active and passive elements 41 through 56 is obtained. The outputs do not all have the same polarization and, for the embodiment of FIG. 1, have a polarization pattern of alternating RCP and LCP as the elements are scanned from left to right. Recognizing that such variation is present is important where outputs having the same circular polarization are desired or required so that fixed half-wave retarders may be placed to convert all the polarization's to the same polarization. Thus, in FIG. 1, for example, fixed half-wave retarders 63 may be placed at the outputs of active elements 41, 43, 45, 47, 49, 51, 53 and 55 to convert their RCP outputs to LCP. The ability to do this conversion is particularly important in arrangements which provide a 3-D output because the perception of 3-D is based on having two spatially displaced images each of which has a different polarization.

If the input to active CLC element 18 in FIG. 1 is changed to LCP and all the CLC members 60 in logic tree structure 1 are changed to be reflective of RCP, the outputs obtained are exactly the same as those shown in FIG. 1.

An identical output pattern to that shown in FIG. 1 is obtainable where the input is LCP and all the members 60 are reflective of LCP.

A pattern opposite to that shown in FIG. 1 is obtainable where the input is RCP and all the members 60 are reflective of RCP.

Figure 2:
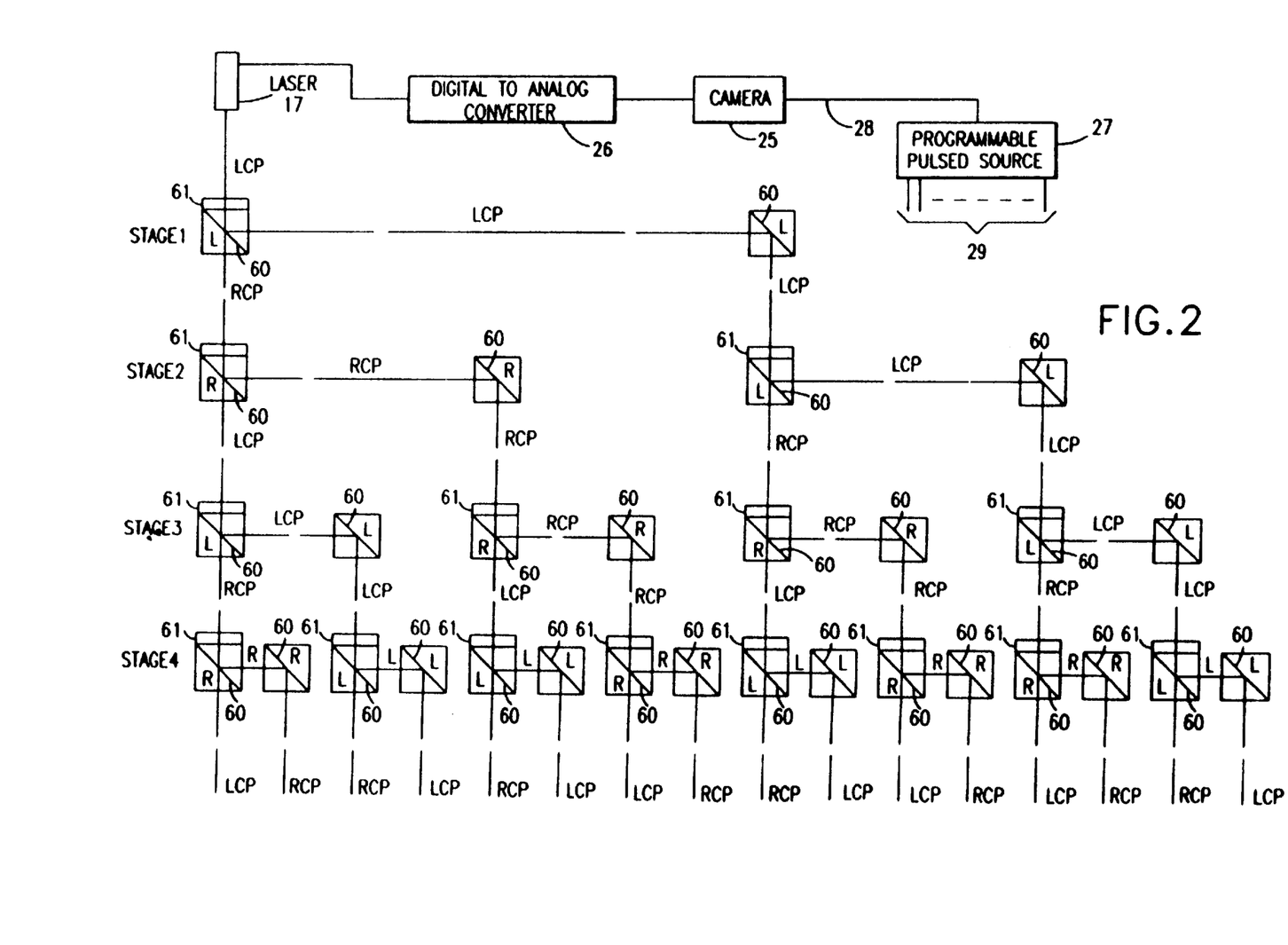
FIG. 2 is a schematic diagram of a logic tree structure similar to that shown in FIG. 1 which shows that the polarization of CLC members may be varied to produce outputs having polarizations different from those shown in FIG. 1.

FIG. 2 is a schematic diagram of a logic tree structure 1 similar to that shown in FIG. 1. It shows only the logic tree structure without the associated laser and electronics. The purpose is to show that the polarization of members 60 reflective of different polarizations may be varied to produce outputs having different polarizations from those shown in FIG. 1. Each of the boxes representing active and passive elements in FIG. 2 contains either the letter L or R indicating that the CLC member 60 therein is reflective of either left-handed or right-handed circular polarization. Without going into exhaustive detail, suffice it to say that the outputs shown in FIG. 2 are obtained from an LCP input having the following polarization pattern when retarders 61 are switched in the same order as described in connection with FIG. 1: LRRL RLLR RLLR LRRL A pattern different from that shown above would be obtained if the input polarization were changed to RCP and members 60 of logic tree structure 1 were reflective of polarization's opposite to those shown in FIG. 2. The output pattern is as follows: RLLR LRRL LRRL RLLR The foregoing illustrates how the output polarization may be controlled for applications where information is polarization encoded or scrambled; transmitted and decoded or unscrambled by using a key which controls the variable half-wave retarders 61.

From the point of view of ease of manufacturing, logic tree structures having the same CLC members 60 are the most advantageous as will be seen when the fabrication process is described hereinbelow.

The arrangement of FIG. 1 provides an advantage over the scanning arrangement shown in U.S. Pat. No. 5,459,591 in that input light has to traverse, in a 1024×1024 array, 1024 CLC members 2 (in the patent) to provide an output at its furthest imaging cell 1 (in the patent). If each CLC member has transmissibility (T), the final imaging cell will have a transmissibility of (T)1024. Thus, even with a transmissibility approaching 1, say 0.999, the output at the 1024THE imaging cell would be: (0.999) 1024 which, to all intents and purposes, is zero.

Opposed to this is the present approach where, to provide the last output in a 1024×1024 array, only twenty CLC members 60 or two per stage need to be traversed providing a transmissibility of (T)20. Under these conditions the 1024the output, assuming T=0.999, would be (0.999)20 which is approximately ninety percent of the input intensity. The minimum transmissibility for a ten stage array would be (T)10 or one transition per stage.

From the foregoing, while logic tree structure of FIG. 1 represents an improvement over the prior art in terms of output light intensity, it should be clear that each logic tree structure 1 requires its own input laser or source of electromagnetic radiation 17. Thus, to provide an 8×8 array, for example, eight logic tree structures 1 would have to be stacked in the manner shown in FIG. 3.

Figure 3:
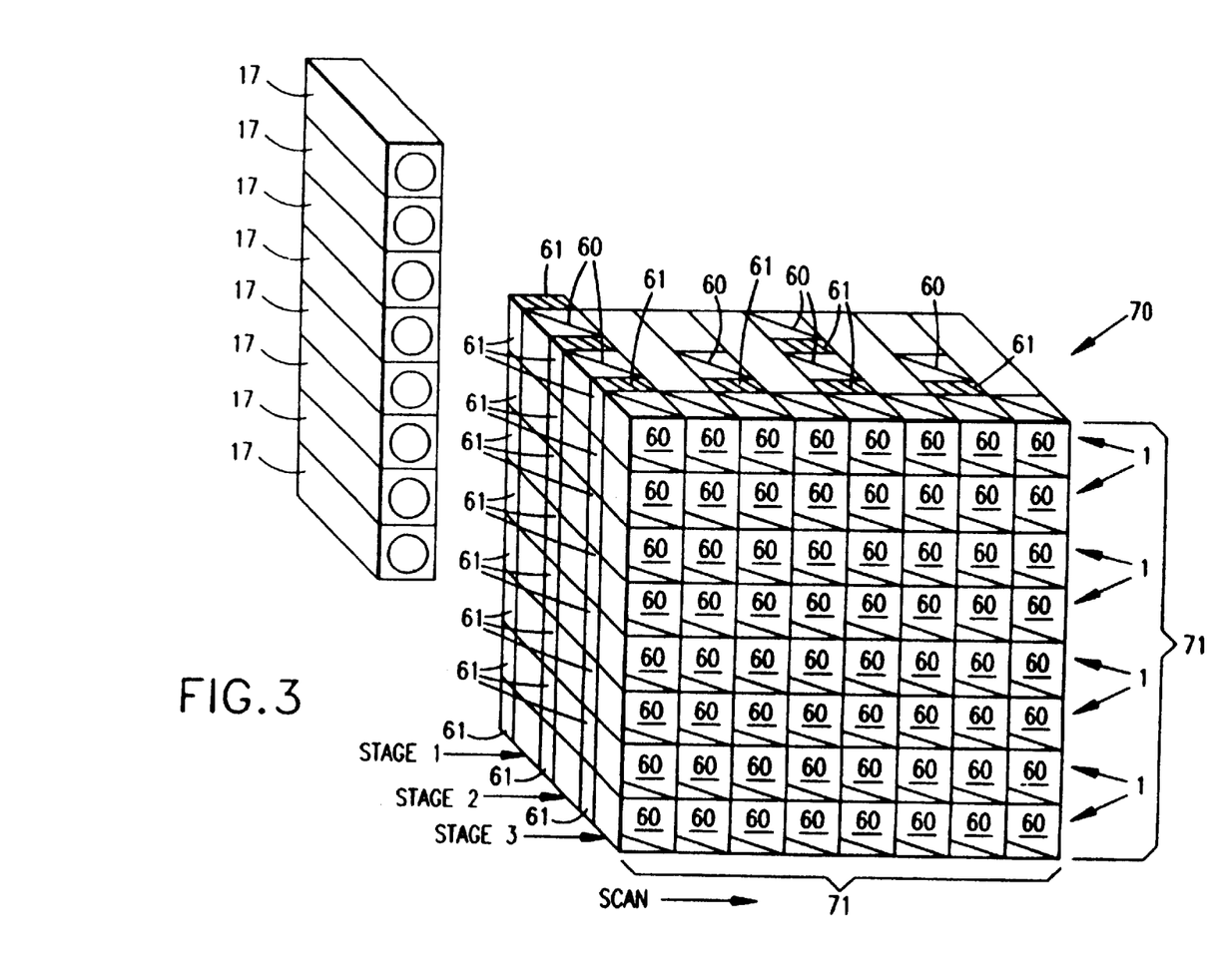
FIG. 3 is an orthographic projection of eight logic tree structures positioned one atop the other which, in accordance with the present invention, provide 64 outputs using one source of electromagnetic radiation per logic tree structure.

FIG. 3 is an orthographic projection of eight logic tree structures 1 positioned one atop the other which, in accordance with the teaching of the present application, provide 64 outputs. One source of electromagnetic radiation 17 per logic tree structure 1 is required.

Because of space limitations, the showing of FIG. 3 has been limited to the use of only three of the STAGES of FIG. 1. Also, since each of logic tree structures 1 in FIG. 3 is identical with the other logic tree structures 1, only the topmost tree w with its CLC members 60 and variable half-wave retarders 61 have been shown. Also, as will become clear hereinafter, the dimensions shown are not to scale.

In FIG. 3, 8×8 array 70 is shown which comprises eight logic tree structures 1 stacked one atop the other. Each logic tree structure 1 is comprised of three stages, STAGE 1, STAGE 2, and STAGE 3. STAGE 1 COMPRISES BRANCH 2; stage 2 comprises branches 3, 4, and STAGE 3 comprises branches 5–8 as shown in FIG. 1. Each branch includes active and passive CLC elements similar to those shown in STAGES 1–3 of FIG. 1 and each of the active and passive elements includes a cholesteric liquid crystal member 60 which is positioned at an angle of 45° within each of the active and passive elements of array 70. Also, included are variable half-wave retarders 61 which are arranged in FIG. 3 just like the variable retarders 61 in STAGES 1–3 of FIG. 1. In FIG. 3, each logic tree structure 1 is activated by an associated source of electromagnetic radiation 17, preferably a laser, thus requiring a total of eight sources 17. As each laser is actuated, variable half-wave retarders 61 are actuated as described in connection with FIG. 1 hereinabove and the output of each laser 17 appears as a scanned modulated signal going from left to right at the outputs of imaging cells 71 of each of logic tree structures 1. In the arrangement shown in FIG. 3, sources 17 and retarders 61 may be actuated sequentially or simultaneously. If the outputs of sources 17 are converted to right-hand circular polarization (RCP) and all CLC members 60 are reflective of eft-hand circular polarization (LCP), the outputs of each logic tree structure 1 of FIG. 3 will be the same as those shown in FIG. 1, namely: RLRL RLRL As suggested in connection with the description of FIG. 1, fixed half-wave retarders may be appropriately positioned to make all the outputs have the same polarization.

While the number of lossy transitions per logic tree structure has been reduced over that shown in the prior art, this has been accomplished by the use of a source 17 for each logic tree structure 1 incorporated in an array 70. With arrangements like that shown in FIG. 3 expanded to a 1024×1024 array, for example, 1024 sources 17 would be required. This requirement can be eliminated and the number of sources reduced to one by using a logic tree structure 1 like that shown in FIG. 1, the outputs of which, provided from a single source 17, act as inputs to an array 70 like that shown in FIG. 3.

Figure 4:
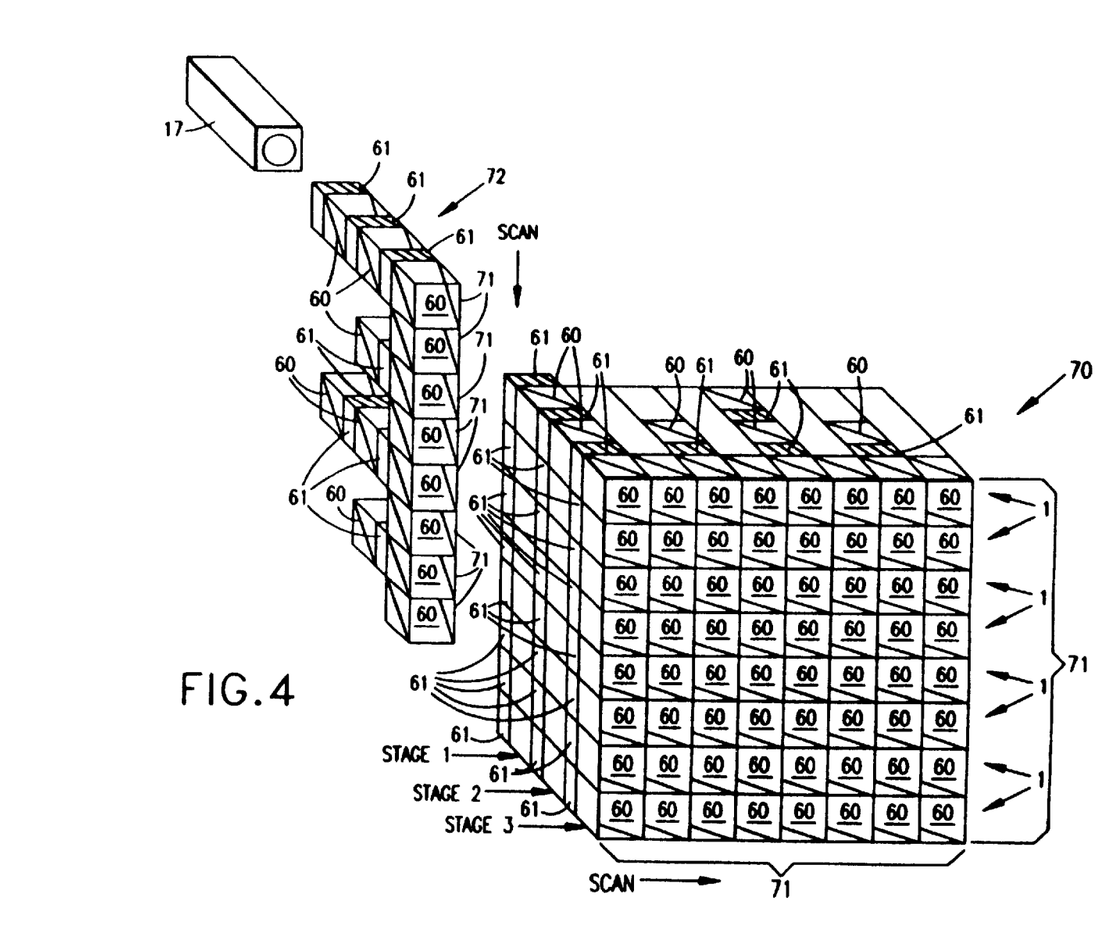
FIG. 4 is an orthographic projection similar to FIG. 3 except that, instead of a plurality of sources of electromagnetic radiation, only a single source of radiation in combination with a logic tree structure like that shown in FIG. 1 and disposed perpendicularly to the stacked logic tree structures of FIG. 3 is required.

This will become clear from a consideration of FIG. 4 which is an orthographic projection similar to FIG. 3 except that, instead of a plurality of sources 17, only a single source 17, in combination with a logic tree structure 1 like that shown in FIG. 1, disposed perpendicularly to the logic tree structures 1 of FIG. 3 is required.

Considering FIG. 4 in more detail, array 70 is identical with array 70 shown in FIG. 3. Also, source of electromagnetic radiation 17 in FIG. 4 is similar to sources 17 shown in FIG. 3. In FIG. 4, an input logic tree structure 72 is shown disposed between array 70 and source 17 such that each imaging cell 71 or logic tree structure 72 acts as an input to an associated logic tree structure 1 of array 70. Thus, the uppermost imaging cell 71 of input logic tree structure 72 provides an input to the leftmost element of the topmost logic tree structures 1 of array 70. This input which may be an intensity modulated signal from source 17, is scanned across the imaging cells 71 of the topmost logic tree structure 1 of array 70 in a manner analogous to the scan of a television frame. When the scanned output of the topmost logic tree structure 1 reaches its last imaging cell 71, the output of source 17 is switched to the next imaging cell 71 (immediately beneath the topmost imaging cell 71) of logic tree structure 72. The output of that next imaging cell then acts as the input to the logic tree structure 1 immediately beneath the topmost logic tree structure 1 of array 70. The inputs to the last mentioned logic tree structure 1 are then delivered to the imaging cells 71 or that logic tree structure 1 in sequence from left-to-right providing a scanned, intensity modulated signal similar to that of a television scan line.

Each of the remaining imaging cells 71 of input logic tree structure 72 is then actuated by programming electrodes 62 and variable half-wave retarders 61 associated with logic tree structure 72 in the same manner described hereinabove in connection with FIG. 1. Similarly, each of the logic tree structures 1 of array 70 is actuated by outputs from an associated imaging cell 71 of input logic tree structure 72. Then, under control of programmed electrodes 62 and half-wave retarders 61, these outputs, now inputs, to an associated logic tree structure 1, are delivered to the imaging cells 71-to-imaging cell 71. In this way, by accessing logic tree structures 1 from top-to-bottom, for example, in FIG. 4, an image is built up which, depending on the imaging cell density, can provide images of extremely high resolution.

From the foregoing, it should be clear that the modulated output of a single source 17, preferably a laser, may be delivered to the imaging cells 71 of a plurality of stacked logic tree structures 1 like array 70 in FIG. 4. As shown in FIG. 4, the use of an input logic tree structure 72 permits the use of a single source 17 as opposed to the multiplicity of sources 17 shown in FIG. 3. The value of the arrangement shown in FIG. 4 becomes more apparent when it is recalled that for a 1024×1024 array embodiment like FIG. 3, 1024 lasers would be required. Thus, in addition to reducing the number of lossy transitions as provided by the embodiment of FIG. 3, the embodiment shown in FIG. 4 also reduces the number of sources 17 required to the absolute minimum of one. While the electronic equipment required to operate displays like those shown in FIGS. 3, 4, has not been shown, it should be appreciated that the same components as shown in FIG. 1 and which are well-known in the imaging arts may be utilized in the practice of the present invention. Thus, timing information obtained from camera 25, for example, is applied via interconnection 28 to programmable pulsed sources 27. The latter then applies switching signals to both logic tree structure 72 and each of logic tree structures 1 to appropriately control their electrodes 62 and half-wave retarders 60 so that a scanned energy output may be delivered from the imaging cells 71 of each logic tree structure 1 and input logic tree structure 72.

Figure 5:
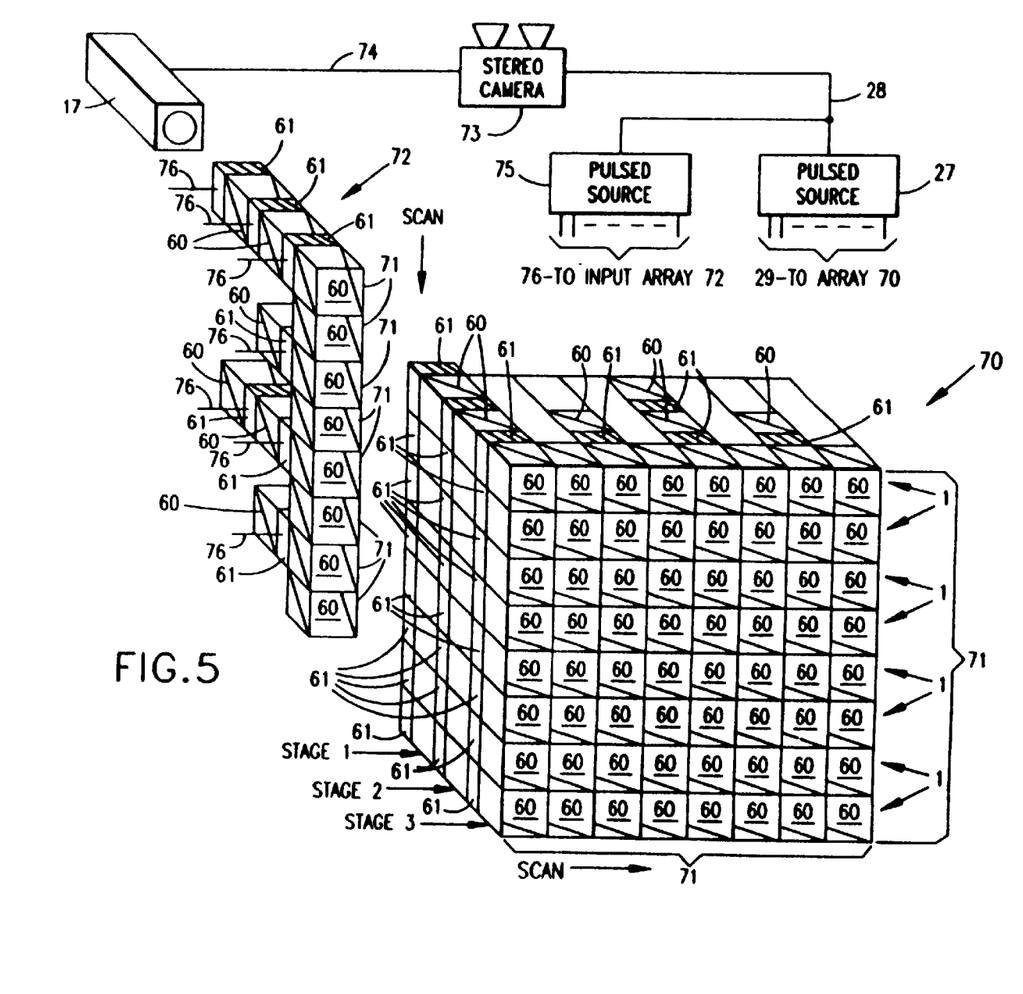
FIG. 5 is an orthographic projection of an imaging array and its associated electronics which, in conjunction with viewing glasses and stereo displaced images,provides a 3-D display.

Referring now to FIG. 5, an orthographic projection of an imaging array is shown which, in combination with viewing glasses and stereo displaced images, provides a 3-D stereoscopic display system.

In FIG. 5, input logic tree structure is accessed by a source 17 of electromagnetic radiation which is modulated by outputs of a stereoscopic television camera 73 via interconnection 74. The two outputs from stereo camera 73 are stereo displaced so that, if they are separated one from the other by some characteristic like polarization, the two resulting images may be delivered one to each eye (using appropriate glasses ) and combined in the brain to provide a three-dimensional image.

One of the images is provided by applying scanned lines from stereo camera 73 via interconnection 74 to laser 17. The output of the latter is then applied to input logic tree structure 72 from which scanned line outputs are delivered from the topmost and alternate imaging cells 71 under control of programmable pulsed source 75 which actuates variable half-wave retarders 61 1 thereof via interconnections 76. The output from the topmost of imaging cells 71 input logic tree structure 72 is applied for a given interval to leftmost member 60 of the uppermost of logic tree structures 1. At the same time, variable half-wave retarders 61 under control of programmable pulsed source 27 are appropriately actuated so that a portion of the scanned line from stereo camera 73 is delivered to each of the imaging cells 71 of the uppermost of logic tree structures 1 of array 70.

In the instance of FIG. 5, each imaging cell 71 of array 70 is illuminated for a time equal to ⅛ the given interval of a scanned line from camera 73. For a 1024×1024 array, the illuminating time would be ¹⁄₁₀₂₄the of the scanned line interval.

The first image is completed by applying scanned lines from stereo camera 73 via interconnection 74 which modulate laser 17 during each alternate interval after the first to each alternate imaging cell 71 after the first imaging cell 71 of input logic tree structure 72. Each scanned line is delivered to the imaging cells 71 of each alternate logic tree structure 1 of array 70 in the same manner described in connection with the delivery of the first scanned line to the uppermost of logic tree structures 1 of array 70.

The stereo displaced image from stereo camera 73 is delivered as scanned lines via interconnection 74 to laser 17 where they modulate the output of laser 17. The stereo displaced scanned line outputs are delivered to laser 17 during the second and alternate intervals fatter the second interval. The first stereo displaced output from laser 17, under control of programmable pulsed source 75 which appropriately actuates the variable half-wave retarders 61 of input logic tree structure 72, is delivered to the second-from-the-top of imaging cells 71 of logic tree structure 72 as a scanned line. This last mentioned output acting as an input to the leftmost CLC member 60 of the second-from the top of logic tree structures 1 of array 70 is delivered to the imaging cells 71 of the second-from-the top of logic tree structures 1 of array 70 under control of programmable pulsed source 27 as portions of the scanned line output of laser 17.

As with the first image generation, the imaging, cells 71 of the stereo displaced image are illuminated for a time equal to 1/8 the given interval of a scanned line.

The stereo displaced image is completed by applying scanned lines from stereo camera 73 via interconnection 74 to laser 17 during each alternate interval after the second interval to each alternate imaging cell 71 after the second imaging cell 71 of input logic tree structure 72. Each stereo displaced scanned line is delivered to the imaging cells 71 of the second and alternate logic tree structures 1 of array 70 in the same manner described in connection with the delivery of the first stereo displaced scanned line to the second-from-the-top of logic tree structures of array 70.

If the polarization state of the beam applied to logic tree structures 1 is RCP and the members 60 thereof are designed to reflect LCP, then the logic tree structures 1 provide an image at their imaging cells 71 in the same way described in connection with FIG. 1 and the resulting outputs will have polarizations like those shown in FIG. 1. The polarizations at STAGE 3 for each of logic tree structures 1 are: RLRL RLRL.

To obtain this result, however, input logic tree structure 72 must provide RCP at all its imaging cells 71. This requires an RCP input from laser 71, a logic tree structure with elements which reflect LCP and fixed half-wave retarders 63 (not shown) disposed after imaging cells 71 which provide LCP outputs.

To obtain a single polarization for all of the outputs of first and alternate logic tree structures 1 of array 70, for example, RCP, the LCP outputs of these logic tree structures 1 must be converted to RCP. This is accomplished by interposing fixed half-wave retarders 63 over the imaging cells 71 having LCP outputs.

Similarly, to obtain a single but opposite polarization for all of the outputs of the second and alternate logic tree structures 71, for example, LCP, the RCP outputs of these logic tree structures 1 must be converted to LCP. This is accomplished by interposing fixed-half wave retarders 63 over the imaging cells 71 having RCP outputs.

At this point, two stereo-displaced images appear at the output imaging cells 71 of array 70. One image has an RCP polarization while the other has an LCP polarization. Then, using glasses which have one lens which passes RCP and another lens which passes LCP, a 3-D image is perceived by a viewer.

In connection with the 3-D embodiment of FIG. 5, it should be appreciated that outputs from stereo camera 73 may be in either digital or analog form. If the former, the digital signals may be converted to analog signals using a digital-to analog converter in a well-known way. Also, to the extent that logic tree structures 1 are provided with signals representing a scanned line of an image and a stereo displaced image, these signals are arranged to alternately access alternate ones of logic tree structures 1 in succession until two stereo displaced images are formed at the imaging cells 71 of array 70. The scanned lines of an image and a stereo displaced image are electronically interlaced so that source 17 is modulated first by signals representing a scanned image and then by signals representing a scanned stereo displaced image and so on in succession until the two images are formed.

From FIG. 5, it can be seen that, for a 3-D array, two 4×8 interleaved arrays are required, one for an image and another for a stereo displaced image. Extrapolating this information to a practical level, if 1024 imaging cells are wanted for each image, an array of 2048×1024 imaging cells would be required. Using the same approach as demonstrated by FIG. 5, two 512×1024 interleaved arrays may be used with the sacrifice of some resolution. In FIG. 5, logic tree structures 1 have been interleaved horizontally for ease of fabrication, but they may be interleaved vertically without departing from the spirit of the present application.

Figure 6:
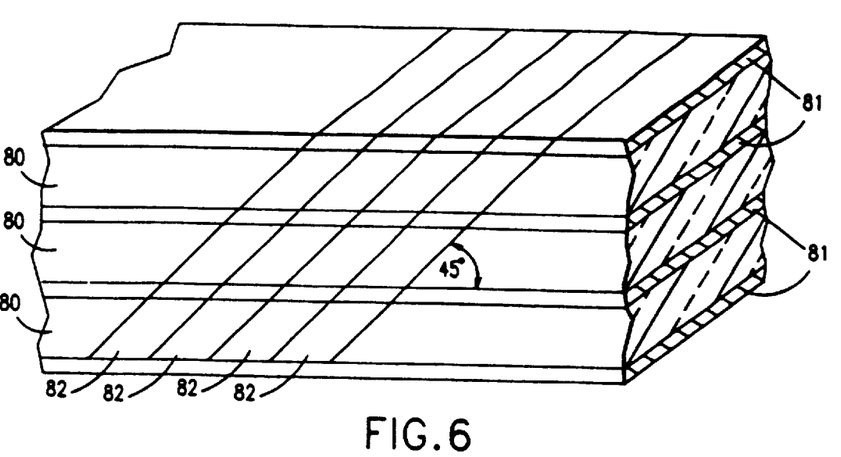
FIG. 6 is an orthographic, cut-away projection of a plurality of layers of insulating material like SiO2 and a plurality of layers of CLC material interleaved with the layers of insulating material. The interleaved layers are sliced at an angle of 45°.

Referring now to FIG. 6, there is shown an orthographic, cut-away projection of a plurality of layers 80 of insulating material, like SiO2 polycarbonate, acrylic or any other appropriate optically transparent material, and a plurality of layers 80 of cholesteric liquid crystal (CLC) material interleaved with layers 80.

In FIG. 6, layers 80, 81 are subjected to a slicing operation which cuts into layers 80, 81 at an angle, preferably 45°. Layers 80, 81 may be cut by saws, lasers, jets or other appropriate tools to provide layers 82 which contain CLC members 60 disposed at an angle of 45° in insulating material as shown in FIG. 7.

Figure 7:
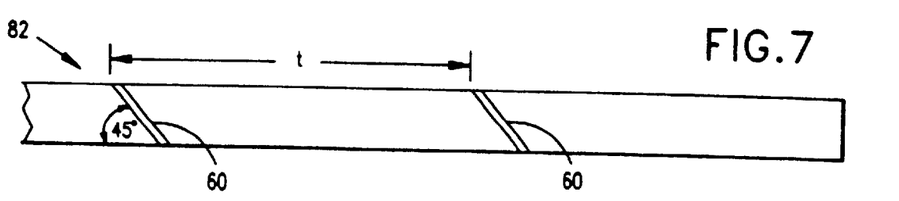
FIG. 7 is a cross-sectional view of a layer of insulating material in which CLC members are disposed at an angle of 45° and are spaced apart by a distance t.

FIG. 7 is a cross-sectional view of a layer of insulating material in which CLC members 60 are disposed at an angle of 45°. The spacing of CLC members 160 is determined by controlling the thicknesses of insulating layers 80 prior to the slicing step of FIG. 6. Since alignment of CLC members 60 is important in transmitting electromagnetic energy from stage-to-stage, the spacing of members 60 must be carefully controlled. Thus, in FIG. 7, the spacing between CLC members 60 is t units and could comprise STAGE 1, for example, of array 70 of FIG. 4.

Figure 8:
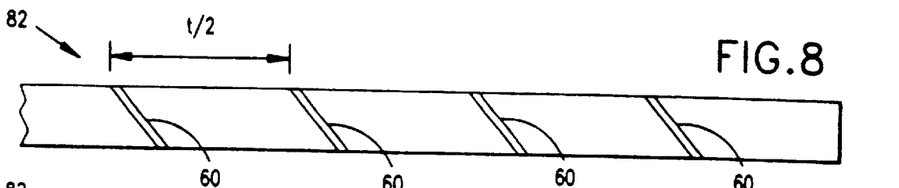
FIG. 8 is a cross-sectional view of a layer of insulating material in which CLC members are disposed at an angle of 45° and is similar to FIG. 7 except that the CLC members are spaced apart by a distance t/2.

FIG. 8 is a cross-sectional view of a layer of insulating material in which members 60 are disposed at an angle of 45° and is similar to FIG. 7 except that members 60 are spaced apart by t/2 units. Layer 82 and other like layers are fabricated by slicing an arrangement like that shown in FIG. 6 except that the thicknesses of layers 80 of insulating material are reduced to half that shown in FIG. 6. After slicing a stack like that shown in FIG. 6, the resulting layer 82 with a spacing of t/2 between members 60 could comprise stage 2, for example, of array 70 of FIG. 4.

Figure 9:
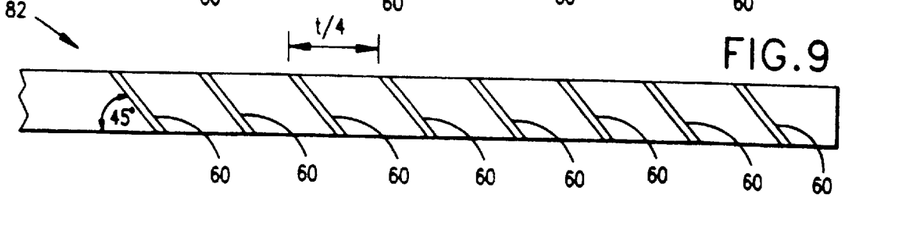
FIG. 9 is a cross-sectional view similar to that shown in FIG. 7 except that the CLC members are spaced apart by a distance t/4.

FIG. 9 is a cross-sectional view of a layer of insulating material in which members 60 are disposed at an angle of 45° and is similar to FIG. 7 except that members 60 are spaced apart by t/4 units. Layer. 82 in FIG. 9 is fabricated by slicing an arrangement like that shown in FIG. 6 except that the thicknesses layers 80 would be reduced to one-quarter that shown in FIG. 6. After slicing a stack like that shown in FIG. 6, the resulting layer 82 with a spacing t/4 between members 60 could comprise STAGE 3, for example, of array 70 of FIG. 4.

The spacing of members 60 is always reduced by half as additional stages are added so that higher and higher resolutions may, be obtained. Thus, for an array with ten stages, the spacing between CLC members 60 would be t/512 units.

By slicing arrangements like that shown in FIG. 6 and controlling the thicknesses of layers 80, layers 82 with members 60 spaced apart by different amounts like those shown in FIGS. 7–9 may be easily obtained. As will be seen below, layers 82 with appropriately spaced members 60 may be stacked to produce an array 70 like that shown in FIG. 4 or an array having as many stages as desired. This can be done on a mass-production basis to produce literally thousands of layers like layers 82 of FIGS. 7–9.

Figure 10:
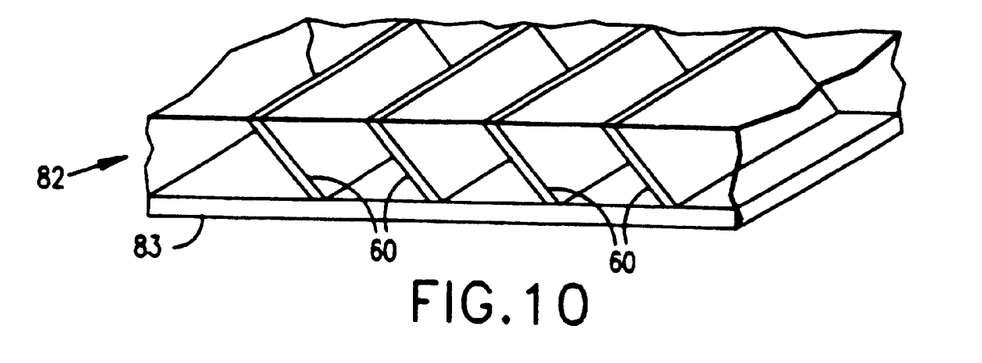
FIG. 10 is a cross-sectional, orthographic projection of an insulation layer with CLC members disposed at an angle of 45° therein like that shown in FIG. 8 and further includes a ground plane disposed on the bottom thereof.

FIG. 10 is a cross-sectional, orthographic projection of a layer 82 which contains CLC members 60 disposed at an angle of 45° therein. Layer 82 in FIG. 10 is similar to layer 82 of FIG. 8 except that in FIG. 10, a ground plane 83 is deposited or formed on the bottom of layer 82. Layer 83 is transparent and metallic in character and acts as a ground plane for subsequently deposited electrodes which activate variable half-wave retarders 61. A material like indium-tin oxide (ITO) may be deposited or formed in a well-known way on the bottom of layer 82 of FIG. 10. The transparency of ITO, of course, permits the transmission of light energy from stage-to-stage with little or no loss in intensity.

Figure 11:
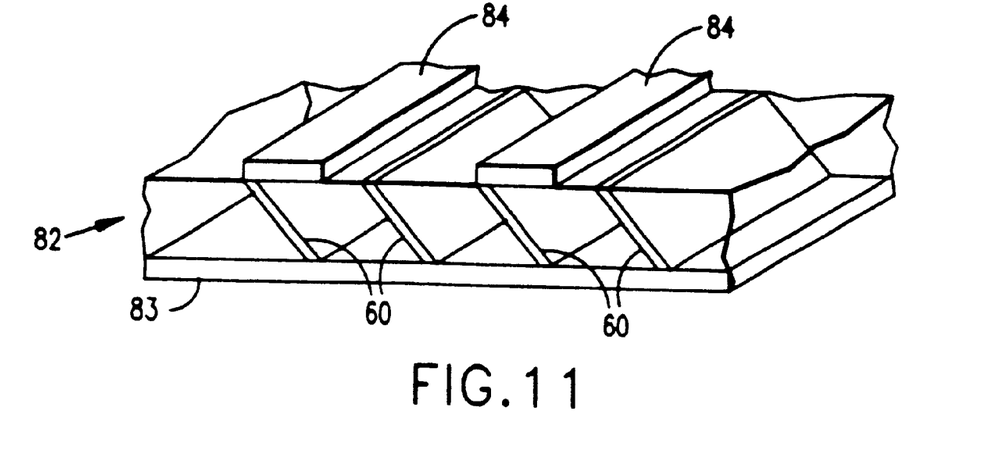
FIG. 11 is a cross-sectional orthographic projection similar to FIG. 10 except that is further includes electrodes disposed over every other CLC member.

Referring to FIG. 11, there is shown a cross-sectional, orthographic projection similar to FIG. 10 except that electrodes 84 are shown disposed over every other CLC member 60, like they would be if layer 83 of FIG. 11 were to be utilized as a STAGE 2 in an array 70 like that shown in FIG. 4. This pattern of electrode spacing will always be the same regardless of which stage is being considered. A reconsideration of FIG. 1 shows this to be true since each stage always comprises at least one branch consisting of active and passive CLC elements. Electrode 84 (62 in FIG. 1) is always associated with and forms a part of variable half-wave retarders 61 which, in turn, is always associated with the active CLC element of any branch. Like ground plane 83, electrode 84 is comprised of indium-tin-oxide (ITO) material which is transparent to the electromagnetic radiation being utilized. To obtain electrodes 84 in the form shown in FIG. 11, indium-tin oxide is formed atop layer 82 and, using well-known lithographic, masking and etching techniques, electrodes 84 are inappropriately positioned over every other CLC member 60. Rather than carrying out two separate deposition steps for ground plane 83 and electrodes 84, the ITO material may be formed simultaneously on each side of layer 82. Then, the photolithographic, masking and etching steps are carried out.

Figures 12, 13:
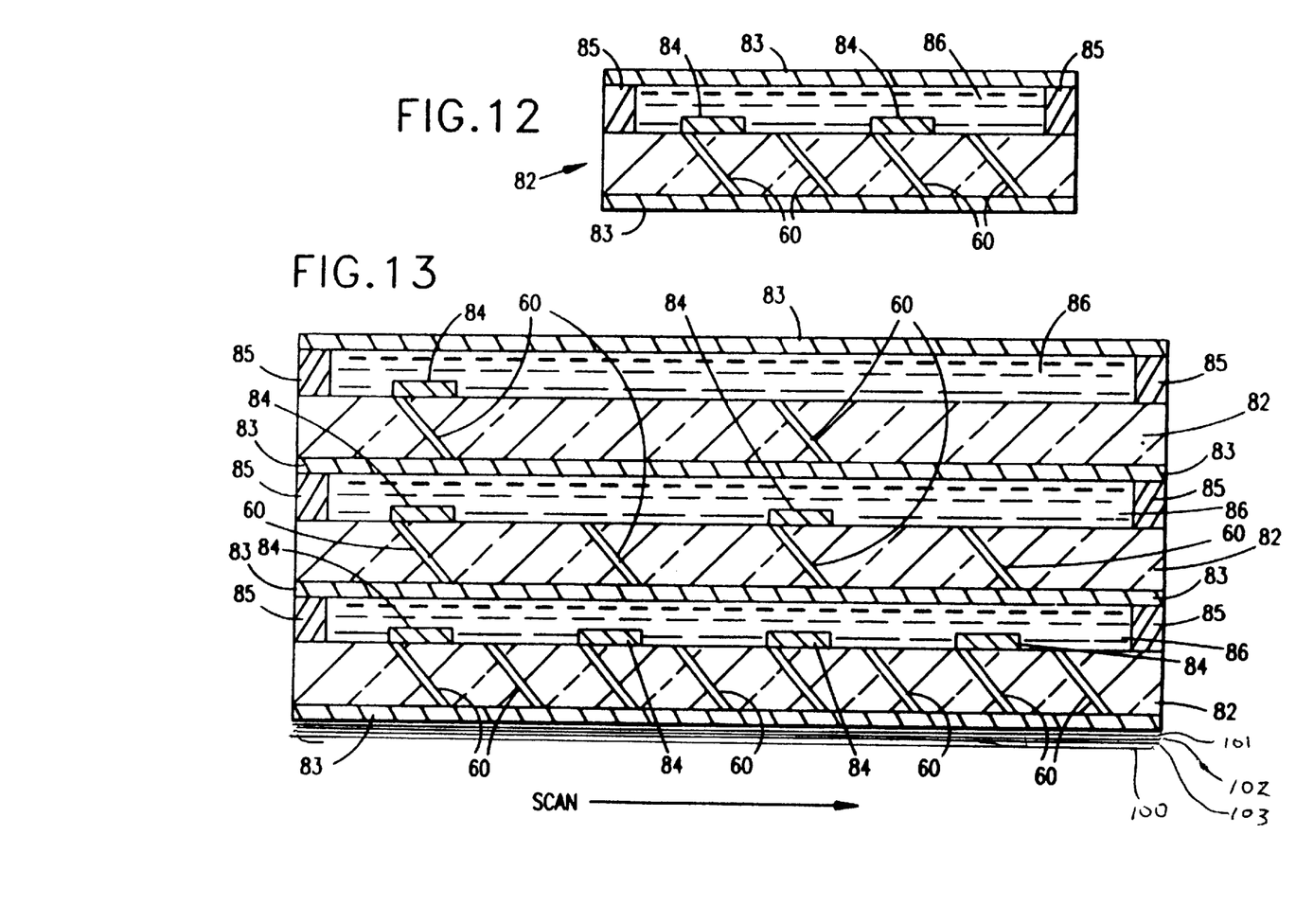
FIG. 12 is a cross-sectional view similar to that shown in FIG. 11 further including a spacer disposed around the periphery of the layer of insulation material with the resulting enclosed volume filled with a phase-shifter material in liquid form.
FIG. 13 is a top view of a logic tree structure made up of layers like those shown in FIGS. 7–12 after they have been stacked and aligned to form an array like those shown in FIGS. 3, 4 and 5.

Referring now to FIG. 12, there is shown a cross-sectional view of a layer 82 similar to that shown in FIG. 11 except that a spacer is added around the periphery of layer 82 and the thus enclosed volume is filled with a phase-shifter material in liquid form.

In FIG. 12, a spacer 85 is formed around the periphery of layer 82 by, for example, gluing a spacer 85 of insulating material around the edge of layer 82. Spacer 85 separates layers 82 from other overlying layers and defines the volume into which phase-shifter material 86 is placed.

FIG. 13 is a top view of a logic tree structure i made up of layers 82 like those shown in FIGS. 7–12. The arrangement of FIG. 13 shows the topmost logic tree structure 1 of FIG. 4 after it has been fabricated in accordance with the teaching of the present application FIG. 13 can also be considered a side-view of input logic tree structure 72 since its structure does not depart in any way from the structure of logic tree structure 1.

One way of assembling the structure of FIG. 13, is to stack a finished layer 82 like that shown in FIG. 12 on a finished layer 82 like that shown at the bottom of FIG. 13. Another layer 82 like that shown at the top of FIG. 13 is stacked atop the finished layer 82 of FIG. 12. The layers are glued together with the topmost layer 82 forming STAGE 1 as shown in FIG. 4; the middle layer 82 forming STAGE 2 as shown in FIG. 4, and the bottom layer 82 forming STAGE 3 as shown in FIG. 4. Thus, inputs provided to the leftmost CLC member 60 of topmost layer 82 will, under control of inputs to electrodes 84 from pulsed source 27, appear as outputs emanating, from left-to-right, from CLC members 60 of bottommost layer 82 as a scanned line of modulated or unmodulated flight.

For the array, once stacked, the top and bottom thereof may be covered with insulating layers, one of which contains holes which register with the ends of electrodes 84 and ground planes 83. Thus, even when logic tree structures 1 are not being utilized, their associated electrodes 61., 84 which extend from top-to-bottom of array 70 are electrically connected as shown in FIG. 5 and are simultaneously energized.

Inputs to the stacked logic tree structures 1 are provided, as shown in FIG. 4, from imaging cells 71 of input logic tree structure 72. The orientation of input logic tree structure 72 with respect to array 70, is best shown in FIG. 4 which does not depart in any way from the arrangement of FIG. 13. The latter Figure merely shows the structural details to better effect. Thus, as previously explained in FIG. 4, outputs from imaging cells 71 of input logic tree structure 72 are scanned from top-to-bottom of tree 72 and each output initially accesses the leftmost member 60 of its associated logic tree structure 1 such that outputs appear at imaging cells 71 or array 70 as a plurality of left-to-right scans which go from the topmost logic tree structure 1 to the bottommost logic tree structure 1 of array 70.

Input logic tree structure 72 may take the form of an array 70 rotated 90° so that imaging cells 71 thereof register with the leftmost retarder 61 of each of the logic tree structures 1 like lasers 17 as shown in FIG. 3. In this instance, only a single logic tree structure 1 of the rotated array 70 is energized.

Alternatively, the array shown in FIG. 13 may be fabricated without introducing the phase shifter material 86. The structure of FIG. 13 is then sliced in a direction parallel to the surface thereof resulting in a structure similar to input logic tree structure 72 as shown in FIG. 4. The resulting slice is placed on an insulating layer and bonded to it. A cover layer of insulating material having holes therein which register with electrodes 84 and ground planes 83 is fabricated by drilling or etching using well-known photolithographic techniques. The volumes enclosed by the insulation layer are now filled with liquid phase shifter material 86. The cover layer is affixed to the other side of the logic tree structure slice. A metallic layer such as aluminum is then deposited on the surface of the cover layer and in the holes previously formed therein. Then, using well-known photolithographic masking and etching techniques, conductors to electrodes 84 in a ground planes 83 are formed.

Without going into exhaustive detail, it should be appreciated that the side of input logic tree structure 72 of FIG. 4 may be butted against the back of array 70. In this way, the overall thickness of the arrangement of FIG. 4 is substantially reduced. Well-known optical techniques using reflectors may be used to apply a 90° turn to light emanating from imaging cells 71 of tree 72 when it is butted against the back of array 70.

Since electrodes 84 extend from front-to-back on each logic tree structure 1 as shown, for example, in FIG. 13, they are best accessed from the front or back of the array with activating metallic lines 29, as shown in FIG. 4, extending in insulated spaced relationship with a surface of array 70 to a plug which can be connected to pulsed source 27, for example. This may be accomplished using well-known photolithographic and etching techniques.

The arrangements shown in FIGS. 6–2 may have the following typical dimensions:

| | |
|---|---|
| Layers 82 | 0.5 mm thick and up |
| Electrodes 84 | 500 Å to 1000 Å thick |
| Ground Planes 83 | 500 Å to 100 Å thick |
| Spacer 85 | 1µ to 10µ thick |
| Elements 60 | 2µ to 30µ thick |
| Cells 71 | 0.5 mm wide and up (but may exceed 10 cm) |

Typical voltages applied to electrodes 84 may range between 5V and 100 V.

From the foregoing, it should be clear that arrays 70 may range in size from that typical of television sets used in the home to displays similar to those used in stadiums of various sorts. The resulting arrays are flat, light weight, require but a single laser source or multiple laser sources and are inexpensive and easily fabricated.

In some applications, it will be desired to permit users to view a displayed image from a wide range of viewing angles while physically present before the display surface of the flat image display device of the present invention. In such applications, it will be desirable to mount a pixelated light dispersive layer 100 over the array of beam steering cells 60, as shown in FIG. 13, and as taught in Applicant's International Publication No. WO 95/24671, incorporated herein by reference. The spatial period of this light dispersive layer, or panel 100, will be selected to be same as the spatial period of the underlying beam steering array. The light dispersive layer may contain random micro-prisms to disperse the light rays of the laser beam as it emerges from the display surface.

In some applications, it may also be desirable to mount a phosphor layer over the imaging (i.e. beam steering) array as shown in FIG. 13, and as taught in Applicant's International Publication No. WO 95/24671, incorporated herein by reference, so that transmitted visible light is sustained over a predetermined time duration, at activated beam steering cells when the laser beam interacts with the phosphor laser. Such phosphors can exploit the retinal persistence characteristics of the human vision system, and thus permit slower beam scanning, speeds, while achieving acceptable image display performance.

In yet other embodiments of the present invention, it may be desired or required to use laser beams which are invisible to the human vision system. In such applications, as shown in FIG. 13, and as taught in the Applicant's International Application No. WO 95/24671, supra, a fluorescent layer or panel 101 may be mounted upon the array of beam steering cells 60. In this way, when the laser beam passes through the fluorescent layer, a shift in wavelength naturally occurs and the emerging light therefrom is within the visible band of the electromagnetic spectrum. Details of such optical arrangements are well known in the television and illumination arts.

Any display system of the present invention may be modified to project high-resolution color images onto remote viewing surfaces (e.g. a projection screens, wall surfaces, etc.) by simply mounting a projection element (e.g. holographic lens, Fresnel lens, or other optical element) 102 either upon or in front of the display surface of any image display panel structure disclosed herein, as shown in FIG. 13, and as taught in the Applicant's International Application No. WO 95/24671, supra. Any one of the hereinbefore described light producing or dispersing mediums, including a pixelated light dispersive panel, phosphor coatings, and fluorescent layer, may be mounted between the display surface and the projection element employed depending, of course, on the particular application at hand.

In addition, a micropolarization panel 103, of the type sold by Reveo, Inc. of Elmsford, N.Y. under the tradename, µPol optics, and disclosed in WIPO Publication No. Wo 97/16762 and incorporated herein by reference in its entirety, may be laminated directly onto the display surface of any of the image display structures shown in FIG. 13 and described hereinabove to provide a stereoscopic display panel for use with spatial-multiplexing technology commercially available from VRex, Inc., also of Elmsford, N.Y. Electrically-passive polarizing eyewear can be distributed to viewers to enable 3-D stereoscopic viewing experiences in theaters, stadiums, auditoriums, and the like.

Notably, depending on the particular embodiment of the present invention being praticed, layers and/or panels 100, 101,102 and 103 may be provided upon the image array, as shown in FIG. 13, alone or in a combination with other layers and/or panels.

The size of the images producable by the image display method of the present invention is limited only by the retention time of the human vision system. The use of phosphor coatings as discussed above may be helpful in this regard. Also, if truly huge images must be produced, then it is possible to partition portions of the desired image and simultaneously generate each image portion using a separate image display structure, as taught herein, while each such image display structure is operated under the control of a central display controller, as taught in Applicant's International Application No. WO 95/24671, supra.

Alternatively, the beam scanning devices hereof can be used in other systems, such as bar code symbol scanners, image scanners, optical interconnection devices, spatial intensity modulators, and the like.

It is understood that modifications to the illustrative embodiments will readily occur to persons skilled in the art. All such modifications and variations are deemed to be within the scope and spirit of the present invention as defined by the accompanying claims to invention.

What is claimed is:

1. An electro-optical image display system for producing visible images for viewing by a viewer, comprising:

electromagnetic beam producing means for producing an electromagnetic beam having substantially collimated beam characteristics;

control signal producing means for producing electrical control signals in response to video signals representative of an image to be displayed; and an image display device having
a display surface having substantially planar surface characteristics, and
an array of beam steering elements arranged in the form of a logic tree structure, each said beam steering element comprising a passive CLC element and an electrically-active CLC element, and being controllable for steering said electromagnetic beam within said image display device, wherein, in response to said electrical control signals produced by said control signal producing means, one or more of said beam steering elements steers said electromagnetic beam along a, so that light rays in the visible spectrum emerge from said display surface to thereby produce said image on said display surface, for viewing by said viewer.

2. The electro-optical image display system of claim 1, wherein said display surface further comprises a fluorescent layer for shifting the wavelength of said electromagnetic beam as said electromagnetic beam travels substantially perpendicular to said display surface, in the direction of said viewer.

3. The electro-optical image display system of claim 1, wherein said display surface further comprises
- a light emitting layer for producing said visible light over a predetermined time duration, at said one or more electrically controllable beam steering cells when said electromagnetic beam interacts with said light emitting layer.

4. The electro-optical image display system of claim 1, wherein said light emitting layer comprises a phosphor coating.

5. The electro-optical image display system of claim 1, wherein said display surface further comprises
- a light dispersive structure disposed over each said electrically controllable beam steering element, for dispersing in three-dimensions the light rays produced at from said display surface as said electromagnetic beam travels through said light scattering structure.

6. The electro-optical image display system of claim 1,
- wherein said image has a plurality of spectral components, each having a wavelength in a different color band of the visible spectrum;
- wherein said electromagnetic beam also has a plurality of spectral components, each having a wavelength corresponding to the wavelength of the spectral components of said image; and
- wherein, in response to said electrical control signals, each said beam steering element selectively steers any one or more of the spectral components of said electromagnetic beam along selected steering directions.

7. The electro-optical image display system of claim 1, wherein said electromagnetic beam is produced by a laser.

8. The electro-optical image display system of claim 1, wherein the transmission and reflection properties of each said beam steering element is dependent on the wavelength and polarization characteristics or the electromagnetic beam incident thereto.

9. The electro-optical image display system of claim 1, wherein said electromagnetic beam is produced by a laser and is coupled to said image display device by way of a flexible fiber optic cable.

10. The electro-optical image display system of claim 1, which further comprises image projection means for projecting said image onto a display surface remote from said image display device.

11. The electro-optical image display system of claim 1, wherein said displayed images comprise spectral components from different bands in the visible portion of the electromagnetic spectrum.

* * * * *